United States Patent [19]

Miyauchi et al.

[11] Patent Number: 5,123,007
[45] Date of Patent: Jun. 16, 1992

[54] METHOD FOR RECORDING, REPRODUCING AND ERASING INFORMATION AND THIN FILM FOR RECORDING INFORMATION

[75] Inventors: Yasushi Miyauchi, Sakai; Motoyasu Terao, Tokyo; Tetsuya Nishida, Koganei; Shinkichi Horigome, Tachikawa; Norio Ohta, Sayama, all of Japan

[73] Assignee: Hitachi, Ltd., Tokyo, Japan

[21] Appl. No.: 474,255

[22] Filed: Feb. 5, 1990

Related U.S. Application Data

[63] Continuation of Ser. No. 45,537, May 4, 1987, abandoned.

[30] Foreign Application Priority Data

| May 2, 1986 | [JP] | Japan | 61-101130 |
| Jul. 7, 1986 | [JP] | Japan | 61-157822 |
| Jul. 15, 1986 | [JP] | Japan | 61-164826 |

[51] Int. Cl.$^5$ ............................................. G11B 7/00
[52] U.S. Cl. ........................................ 369/100; 369/116
[58] Field of Search .............. 369/100, 112, 116, 275, 369/288

[56] References Cited

U.S. PATENT DOCUMENTS

| 3,736,046 | 5/1973 | Zook | 346/76 L |
| 3,801,966 | 4/1974 | Terao | 365/113 |
| 4,285,056 | 8/1981 | Bell | 369/288 |
| 4,300,227 | 11/1981 | Bell | 369/100 |
| 4,371,954 | 2/1983 | Cornet | 365/113 |
| 4,470,053 | 9/1984 | Moffitt | 365/113 |
| 4,488,277 | 12/1984 | McFarlane et al. | 369/116 X |
| 4,504,938 | 3/1985 | Tajima | 369/112 X |
| 4,507,767 | 3/1985 | Takasugi | 369/116 X |
| 4,527,173 | 7/1985 | Gupta | 369/100 |
| 4,584,259 | 4/1986 | Mayer | 346/76 L |
| 4,599,718 | 7/1986 | Nakagawa | 369/275 |
| 4,622,564 | 11/1986 | Kaku et al. | 346/107 R |
| 4,651,172 | 3/1987 | Watanabe | 346/135.1 |
| 4,656,079 | 4/1987 | Yamada | 369/100 |
| 4,665,512 | 5/1987 | Ando | 369/112 X |
| 4,679,184 | 7/1987 | Yoshida et al. | 369/112 |
| 4,694,447 | 9/1987 | Cohen et al. | 369/112 X |
| 4,695,994 | 9/1987 | Steenberger | 369/100 |
| 4,710,911 | 12/1987 | Yamada | 369/100 |
| 4,718,053 | 1/1988 | Soto | 369/44 |
| 4,737,934 | 4/1988 | Ross | 365/113 |
| 4,742,505 | 5/1988 | Takeuchi et al. | 369/121 X |
| 4,744,055 | 5/1988 | Hennessey | 365/113 |
| 4,815,058 | 3/1989 | Nakamura et al. | 369/100 |

FOREIGN PATENT DOCUMENTS

| 54-103307 | 8/1979 | Japan | 369/112 |
| 54-143606 | 11/1979 | Japan | 369/112 |
| 61-131235 | 6/1986 | Japan | 369/112 |
| 61-206937 | 9/1986 | Japan | 369/112 |
| 61-206951 | 9/1986 | Japan | 369/112 |
| 61-206952 | 9/1986 | Japan | 369/112 |

*Primary Examiner*—Stuart S. Levy
*Assistant Examiner*—Kenneth B. Wells
*Attorney, Agent, or Firm*—Antonelli, Terry, Stout & Kraus

[57] ABSTRACT

By recording, reproducing and erasing information by using a recording thin film of the present invention, the information can be recorded, reproduced and erased by a single beam spot and new information can be rapidly rewritten while recorded information is erased. The irradiation beam is not limited to a light beam but it may be other energy beam such as electron beam or ion beam. The record medium is not limited to a disk but it may be tape or card and is applicable to a recording thin film other than the described thin film and to other methods.

By using the described recording thin film, a manufacturing process is simple and reproducible, the recording/reproducing characteristic is high and the information can be stably stored for an extended time period. The record also may be rewritten a number of times.

19 Claims, 4 Drawing Sheets

METHOD FOR RECORDING, REPRODUCING AND ERASING INFORMATION AND THIN FILM FOR RECORDING INFORMATION

This application is a continuation of application Ser. No. 045,537, filed May 4, 1987, now abandoned.

BACKGROUND OF THE INVENTION

The present invention relates to method for recording, reproducing and erasing information by irradiating an energy beam such as a light or electron beam onto an information recording medium, and more particularly to method for recording, reproducing and erasing information by a single beam spot by using a phase change and an information recording medium which is effective for use in the above method.

A prior art method for recording, reproducing and erasing information in a phase change type optical disk is shown in JP-A-59-71140 in which recording is done by irradiating a small circular light spot formed by fully focusing a light beam spot for a short time period to render a recording film to a complete amorphous state by quick heating and cooling, and erasing is done by irradiating an elliptical light spot extending along a track to keep the recording material at a crystallization temperature for a relatively long time so that the amorphous state recorded area is returned to a complete crystalline state. Thus, two different beam spots are used for recording and reproducing.

A second prior art method is disclosed in JP-A-56-148740 in which a single light beam spot is used to erase recorded information in one or a plurality of revolutions of a disk medium and record information in the next revolution.

A third prior art method is disclosed in JP-A-56-145530 in which a light which is intensity modulated between at least two power levels is irradiated to simultaneously record and erase information.

In the first method, since two beam spots are used, two light sources are necessary and an optical system is complex.

In the second method, it is necessary to rotate the disk medium a number of revolutions to update the information, and hence it takes a long time.

In the third method, the above problems are resolved but it is necessary to completely crystallize the recording film prior to recording, and tracking at a reproduction power level, automatic focusing and track or sector address confirmation prior to recording are not effected. Further, since an initial power level is not always an erase power level, a leading portion of the previously written information will not be updated if a start position of updating is deviated.

On the other hand, a recording thin film for the phase change type optical disk is disclosed in JP-B-47-26897 which also describes various thin films such as Te-Ge, As-Te-Ge and Te-O. JP-B-54-41902 discloses various compositions such as $Ge_{10}Tl_4Sb_5Se_{70}$ and $Ge_{20}Bi_{10}Se_{70}$. JP-A-57-24039 discloses thin films of $Sb_{25}Te_{12.5}Se_{62.5}$, $Cd_{14}Te_{14}Se_{72}$, $Bi_2Se_3$, $Sb_2Se_3$, $In_{20}Te_{20}Se_{60}$, $Bi_{25}Te_{12.5}Se_{62.5}$, $CuSe$ and $Te_{33}Se_{67}$.

However, in the prior art, when the rewritable phase change type recording thin film is used, a crystallization rate is low, a semiconductor laser beam is not well absorbed and a sensitivity is low, a reproduced signal intensity is not sufficient, a stability of the amorphous state is low or resistance to oxidation is insufficient.

SUMMARY OF THE INVENTION

It is an object of the present invention to provide a method for recording, reproducing and erasing phase change type information, which can resolve the problems encountered in the prior art method, can record, reproduce and erase information by a simple optical system and can record new information while erasing recorded information in a short time, and also provide a stable phase change type thin film for recording information which is effective to the above method and has good record, reproduce and erase characteristic and a high sensitivity.

The above object is achieved by varying the power of an energy beam such as a light, electron or ion beam between power levels capable of causing a state change (phase change) during recording of information. More specifically, information may be updated (erasing and rewriting) during one passage of the spot on a recording film. A reproduction level of the updating light spot may be used only for tracking and auto-focusing. The power may be rendered zero from the reproduction level for a very short time without affect to the tracking and auto-focusing, and such is within the scope of the present invention.

An average composition of the thin film along a thickness of the information recording thin film is represented by a general formula $A_x B_y C_z D_o$ where x, y and z are atomic percentages and $0 \leq x \leq 30$, $5 \leq y \leq 40$, $15 \leq z \leq 70$ and $30 \leq o \leq \lambda$, and D is at least one element selected from Se and S, C is at least one element selected from Sn, As, Sb, Si, Ge, In and Ga, and B is at least one element selected from Zn, Cd, Al, Pb and Bi. The element B has a function to accelerate a crystallization rate, but since it results in lowering of the crystallization temperature, the stability of the amorphous state is lost unless it is added to a high crystallization temperature material. The element A is at least one of elements other than the elements D, C and B, such as Tl, Cu, Ag, Au, Sc, Y, Ti, Zr, V, Nb, Cr, Mo, Mn, Fe, Ru, Co, Rh, Ni, Pd, Hf, Ta, W, Ir, Pt, Hg, B, C, N, P, O, Te, lanthanide element, actinide element, alkaline metal element, alkaline earth metal element, halogen element and inert gas element. One or plural of the elements B, C and D may be elements in the group A if another element in the respective groups is used. For example, in a Bi-In-Se system, S may be added with less than 30 atomic % and with a sum of S and Se being less than 80 atomic % which is an upper limit for the element group D. Of those, the content of Hg, alkaline metal element, alkaline earth metal element and inert gas element is preferably less than 10 atomic %.

So long as the average composition in the thickness direction of the recording thin film is within the above range, the composition may vary in the direction of the thickness, although the change of the composition is preferably not abrupt.

There are many states of the recording thin film continuously or discontinuously between two states, for example, between perfect amorphous state and perfect crystalline (polycrystalline) state, Accordingly, by changing a power of an energy beam between two levels, binary or digital recording is attained, and by changing it among three or more levels, analog or multi-level recording s attained.

DESCRIPTION OF THE PREFERRED EMBODIMENTS

Figure 1:
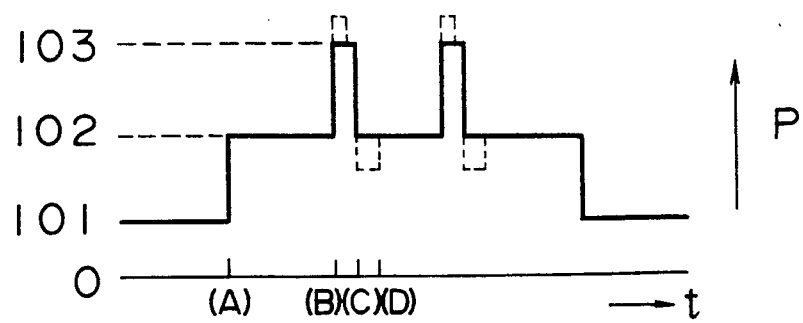
FIG. 1 shows a change of a laser power in a first embodiment of the present invention.

The method of recording, reproducing and erasing information in accordance with the present invention enables so-called overwriting by which new information is recorded while an existing record is erased. Thus, information may be updated (erased and rewritten) while an energy beam spot scans a recording film in one run. For example, a disk is rotated while a recording track (between tracking grooves) is rendered almost to be in an amorphous state and an area between tracks is rendered to be in a crystalline state and information is reproduced by a single laser or electron beam spot. When the beam spot reaches a rewrite position, the power is changed between a plurality of power levels other than a reproduce power level (continuous oscillation) (usually between a record level higher than the reproduce power level and an erase level) to rewrite information. The record level and erase level are defined as laser powers which are optimum for recording and erasing, respectively, to continuously maintain the power. The laser power may be changed by superimposing to a waveform whose power pulsively rises from a reproduce level to a record level in a conventional write-once optical disk, a waveform whose power rises from a power level which is between 0 level to the reproduce level in a rewrite area to an erase level (that is, producing a higher one of those powers). By controlling the power of the superimposing waveform, the rewritable optical disk and the write-once optical disk may be recorded and reproduced by one apparatus. When the power is changed between the two power levels, that is, record power level and erase power level to rewrite information, the decrease of cooling rate due to residual heat of the recording film can be prevented by lowering the power than the lower power level after the higher power level has been reached.

Where a reciprocal phase change type recording material is used and the near-amorphous state is used as a record state while near-crystalline state is used as an erase state and information is recorded with a higher power than the erase level, the power is raised from the reproduce power level to the erase power level and then the power is pulsively raised from the erase level. Thus, the problem encountered in the third prior art is resolved. In the pulsive power reduction for erasing, it is preferable to significantly reduce the power in an initial stage, so that a temperature suitable for erasing is quickly attained. In the pulsive power rise for recording, it is preferable to significantly raise the power in an initial stage to raise the power above the record power level and then lower the power to the record power level. During the irradiation of the laser beam of tne lower power (erasing), the beam spot on the disk medium is preferably enlarged by utilizing a wavelength change due to a mode change by laser power control, reduction of high frequency superposition or control of the amount of return light, or color astigmatism of a lens, or by changing a light path length by utilizing a beam deflector to defocus the beam spot, so that the irradiation time is gained and imperfection of erase information is prevented.

Which of two or more states of the recording film are to be selected as the record state and erase state is arbitrary. For example, a low reflection state by a high power laser beam irradiation may be selected as the record state or it may be selected as the erase state. Since it is preferable to shorten the irradiation time of the high power laser beam in order to avoid deformation of the recording film, it is preferable to select the high power laser beam irradiation state as the record state.

In the present invention, when information is recorded by utilizing the reciprocal phase change between the crystalline state and the near-amorphous state (low regularity of atom arrangement or low crystallization) of the recording film, the generation of noise due to nonuniform crystallization of an area between tracks when the information is repeatedly rewritten can be prevented by previously rendering the area between the record tracks to be in the crystalline state.

If a disk rotation speed is high, a point on the disk may not be completely crystallized because of insufficient irradiation time even if the beam of crystallization energy level is irradiated. If the beam of the crystallization level is again irradiated in the rewriting mode, the crystallization proceeds and the reflection coefficient of the crystallized area is not uniform but varies from point to point. In such a case, it is preferable to set a comparator level to a voltage corresponding to a reflection coefficient of a point of the crystallized area which is closest to a reflection coefficient of a point of other state (near-amorphous state), or a reflection coefficient which is intermediate of said reflection coefficient and a reflection coefficient of a point of the near-amorphous state (if it has a range, a reflection coefficient of a point closest to the crystalline state) so that a signal voltage of the crystallization level is clipped to such a level. In this case, if the comparator level is set to an intermediate voltage between a voltage corresponding to the reflection coefficient of the crystalline state and a voltage corresponding to a reflection coefficient of the near-amorphous state, or a voltage closer to the voltage corresponding to the reflection coefficient of the near-amorphous state, the reproduction of information is assured. If the comparator level is set to a voltage between the above intermediate voltage and a voltage of the crystalline state closest to the intermediate voltage, the original waveform can be exactly reproduced. Other waveform shaping device may be used to shape the waveform.

As to the thin film, the element C such as Sn and the element D such as Se and S may coexist at an appropriate ratio to stably maintain the amorphous state. For example, the ratio of In to Se is preferably 1/0.6 to $\frac{1}{2}$, the ratio of Sn and Se is preferably 1/1.2 to 1/2.5, the ratio of Ga and Se is preferably 1/0.8 to 1/1.4. The ratio of Sb and Se is preferably 1/0.4 to 1/2.0 and the ratio of Ge and Se is preferably 1/0.8 to 1/2.5. The element B such as Bi has a function to accelerate the crystallization rate. Of the elements A, a high melting point element (at least one of elements Cu, Ag, Au, Sc, Y, Ti, Zr, V, Nb, Cr, Mo, Mn, Fe, Ru, Co, Rh, Ni and Pd having a melting point of 800° C. or higher) facilitates absorption of a long wavelength light such as a semiconductor laser beam to enhance a recording sensitivity, and enhances stability of the amorphous state. It has a melting point of 800° C. or higher or produces a compound having the high melting point. Thus, when the crystallization is carried out by the laser beam, it is not molten and high speed crystallization is attained. Of the elements A, Tl and halogen element, particularly I has a function to further accelerate the crystallization. However, if it is added too much, an adverse affect will appear.

The information recording thin film of the present invention which is within the above composition ranges has an excellent record/reproduce characteristic and a power of a laser beam used to record and reproduce may be low. The present recording thin film also has high stability.

More preferable ranges of X, Y, Z and o are: $0 \leq X \leq 20$, $10 \leq Y \leq 35$, $20 \leq Z \leq 55$, $35 \leq \leq \alpha \leq 70$. If the elements A is at least one of the high melting point element Co and Tl and I, it is preferable that $1 \leq X \leq 15$. If the element C is at least one of As, Sb, Si and Ge, excellent characteristics are attained when $20 \leq Y \leq 38$, content of the high melting point element such as Co is preferably between 1% and 15%, and $18 \leq Z \leq 44$.

A most preferable element C is Sn, a next preferable element is In, and a next preferable element is Ga. For the element D, it is preferable that more Se than S is contained. However, S is preferable because of non-poisonous nature. Of the elemnets B, a most preferable one is Bi, a next preferable one is Pb and next preferable ones are Zn and Cd. Of the elements A, most preferable ones are Co and Tl, a next preferable one is Ni, and next preferable ones are Ti, V, Cr, Mn and Zr.

A change of content of each element in a direction of thickness of is usually small although a change in any pattern may exist. For Se and S, it is preferable that it increases more on an inner side in a vicinity of one of the interfaces of the recording thin film. As a result, a resistance to oxidation is enhanced.

It is preferable that at least one surface of the recording film of the present invention tightly contacts to other material for protection. It is more preferable if both surfaces are protected. Those protection layers may be made of synthetic resin (organic high molecular-weight compound) such as acrylic resin plate, polycarbonate plate, epoxy resin plate, or organic compound such as acryl resin, epoxy resin, polyimide, polyamide, polystyrene and polyechylene, or it may be made of an inorganic material primarily consisting of oxide, fluoride, nitride, sulfide, carbide, boride, boron, carbon or metal. It may be a composite material of those materials. The substrate which primarily consists of glass, quartz, safire, iron, titanium or aluminum, may also serve as an inorganic protective layer. The recording film preferably contacts with an inorganic material.

Because inorganic materials have higher heat resistance than organic material. When the inorganic material layer (excluding substrate) is thick, cracking may occur, transmissivity may decrease and/or sensitivity may decrease. Accordingly, it is preferable that the inorganic material layer is thin and a thick organic material layer is tightly contacted to the opposite side of the inorganic material layer to the recording film in order to enhance mechanical strength. The organic material layer may be the substrate. Thus, deformation is also prevented. The organic material may be polystylene, acryl resin, polycarbonate, epoxy resin, polyimide, polyamide, ethylene-vinylacetate copolymer known as hot-melt adhesive, or tackifying agent. It may also be UV light curing resin. When the protective layer is made of the inorganic material, it may be formed by electron beam deposition or sputtering. It may be readily formed by reactive sputtering or by forming a film consisting of at least one element of metal, semi-metal and semiconductor and reacting it with at least one of oxygen, sulfur and nitrogen. Examples of the inorganic material protective layer are compounds which consist of an oxide of at least one element selected from Ce, La, Si, In, Al, Ge, Pb, Sn, Bi, Te, Ta, Sc, Y, Ti, Zr, V, Nb, Cr and W, a sulfide or selenide of at least one element selected from Cd, Zn, Ga, In, Sb, Ge, Sn and Pb, a fluoride of Mg, Ce or Ca, a nitride of Si, Al, Ta or B, a boride of Ti, a carbide of Si, and/or boron and carbon, whose primary composition is close to one of $CeO_2$, $La_2O_3$, $SiO$, $SiO_2$, $In_2O_3$, $Al_2O_3$, $GeO$, $GeO_2$, $PbO$, $SnO$, $SnO_2$, $Bi_2O_3$, $TeO_2$, $WO_2$, $WO_3$, $Ta_2O_5$, $Sc_2O_3$, $Y_2O_3$, $TiO_2$, $ZrO_2$, $CdS$, $ZnS$, $CdSe$, $ZnSe$, $In_2S_3$, $In Sb_2S_3$, $Sb_2Se_3$, $Ga_2S_3$, $Ga_2Se_3$, $MgF_2$, $CeF_3$, $CaF_2$, $GeS$, $GeSe$, $GeSe_2$, $SnS$, $SnSe$, $PbS$, $PbSe$, $Bi_2Se_3$, $Bi_2S_3$, $TaN$, $Si_3N_4$, $AlN$, $Si$, $TiB_2$, $B_4C$, $SiC$, B and C.

In case of the nitride, a composition which is close to $TaN$, $Si_3N_4$ or $AlN$ is preferable because a surface reflection coefficient is not so high and a film is stable and strong. In case of the oxide, a composition close to $Y_2O_3$, $Sc_2O_3$, $CeO_2$, $TiO_2$, $ZrO_2$, $In_2O_3$, $Al_2O_3$, $SnO_2$ or $SiO_2$ is preferable. Amorphous Si or C containing hydrogen is also preferable.

By forming such a protective layer, the increase of noise due to deformation of the recording film in rewriting information is prevented.

When information is recorded by the phase change, it is one approach to previously crystallize the entire surface of the recording film. When the substrate is made of an organic material, the substrate should not be heated to a high temperature and another crystallization method should be employed. In such a case, irradiation of a laser beam focused to a spot diameter of less than 2 $\mu$m, irradiation of UV ray and heating, irradiation of light from a flash lamp such as xenon lamp or Hg-vapor lamp, irradiation of light by a large light spot from a high power gas laser, or irradiation of a laser beam and heating may be preferably used. When the irradiation of light from the gas laser is used, a light spot diameter (half-value width) is preferably between 5 mm and 5 mm in order to attain a high initial crystallization efficiency. Information may also be recorded by crystallizing the amorphous recording thin films or by changing crystal grain sizes in polycrystalline thin film.

When a light is irradiated to a thin film, a reflected light from the thin film surface and a reflected light from the back surface of the thin film are superimposed and interfere to each other. When a signal is to be read by a change of reflection coefficient, the interference effect is increased by providing a light reflection (absorption) layer closely to the recording film so that a read signal is enhanced. In order to further increase the interference effect, an intermediate layer may be provided between the recording film and the reflection (absorption) layer. The intermediate layer also has an effect to prevent mutual diffusion from occurring between the recording film and the reflection layer when the information is rewritten. The intermediate layer is preferably made of a material which does not significantly absorb a readout light. The thickness of the intermediate layer is preferably between 3 nm and 400 nm and selected such that the reflection coefficient of the recording member is almost minimum in a vicinity of a wavelength of the readout light in the recorded or erased state. The reflection layer may be formed either between the recording film and the substrate or the opposite side thereof. Most preferable range of the thickness of the intermediate layer is between 5 nm and 40 nm. It is preferable that the protective layer made of the inorganic material is formed on the opposite side of the reflection layer to the intermediate layer.

The recording film of the present invention may be dispersed into the oxide, fluoride, nitride or organic material usable as the protective layer, by co-evaporation or co-sputtering. As a result, a light absorption coefficient can be controlled to enhance a reproduced signal intensity. A ratio of oxygen, fluorine, nitrogen and carbon to the film is preferably less than 40%. When such a composite film is used, it is usual that the crystallization rate decreases and the sensitivity also decreases. However, in the composite film including the organic material, the sensitivity is increased.

Preferable ranges of the thicknesses of the film and layers are as follows.

Single-layer film (only recording film)
60 nm–450 nm
Preferably 180 nm–350 nm in view of reproduced signal intensity and recording sensitivity.
Two or more layers (including reflection layer)
15 nm–50 nm
Inorganic material protective layer
5 nm–500 nm
(0.1–20 mm when protection is made by the inorganic material substrate)
Organic material protective film
10 mm–10 nm
Intermediate layer
3 nm–400 nm
Light reflection layer
5 nm–300 nm Those layers may be formed by vacuum vapor deposition, vapor deposition in a gas, sputtering, ion beam sputtering, ion beam vapor deposition, ion plating, electron beam vapor deposition, injection molding, casting, spin casting or plasma polymerization.

In the recording film of the present invention, it is not necessary to utilize the change between the amorphous state and the crystalline state for the recording of information, but an optical property may be changed by any change of atom arrangement (widely interpreted phase change). For example, a change between polycrystalline states of different average grain sizes of crystals may be utilized for the recording.

The recording member of the present invention may be used not only in a disk form but also in other forms such as tape and card. It is effective for both the rewriting by a single light beam spot and the rewriting by a multi-light beam spot.

In order to prevent reduction of a CN ratio due to repetitive recording and erasing of information, an area of transition may be continuously irradiated by a light for unification at a time when the reflectivity of some part on the recording track has changed to a predetermined level by the crystallization of the recording film or when at least one of signal level and noise level has changed to a predetermined level. It is preferable to melt a portion of the recording film for unification. The information recorded prior to the continuous light irradiation is temporarily shifted to another place (device) before melting, and it is rewritten after melting. When the above process is carried out in rewriting information, information to be newly written is temporarily stored in another place. A reflectivity of a predetermined portion of the recording film is always monitored so that the change can be detected as soon as possible.

It may be automatically carried out at every predetermined number of times of rewriting, every predetermined number of times of reading or predetermined storage time. By irradiating the continuous light which causes melting of the recording film or a sufficient phase change, the irradiated area is rendered to be in a uniform state, for example, a perfect amorphous state or saturated crystalline state. This means that nonuniformity of crystallization or deformation which affects to signal level or noise level is avoided. If nonuniformity of reflectivity again increases by rewriting or maintenance of the recording film at a high temperature, the above process is repeated so that the recorded information can be stably maintained for an extended period of time. Regardless of the above process, a signal-to-noise ratio of the reproduced signal is determined by a ratio of a higher level and a lower level (which are called high level and middle level and represent heights from zero power level) when the laser power is changed in the record mode. The middle level is preferably between 55% and 90% of the high level, and more preferably between 65% and 85%. If the power waveform is a sine waveform in which a time at which the power level stays at a level is short, an average value in one quarter of a shortest period of vertical movement of the waveform including a lowest portion of the waveform, and an average value in one quarter of the shortest period of vertical movement including a highest portion of the waveform are set as the middle level and high level, respectively.

This method can be applied to the recording film which utilizes the change of reflectivity due to the phase change between the amorphous state and the crystalline state, as well as the recording film which records, reproduces and erases information by utilizing the change of reflectivity due to the change of atom arrangement (widely interpreted phase change) between crystalline states or amorphous states such as between a high crystalline state (high regularity of atom arrangement) and a low crystalline state (including polycrystalline states of different average grain sizes of crystals or different types of crystals), and to an magneto-optic recording film.

EMBODIMENTS

Embodiments of the present invention are now explained in detail with reference to the drawings.

EMBODIMENT 1

FIG. 1 shows a time transition of a laser power P in a method of recording, reproducing and erasing information in accordance with the present invention. A recording track of an optical disk medium having a diameter of 130 mm and an In-Se recording film which enables rewriting of information by a phase change between a crystalline state and a near-amorphous state, is rendered to be in the near-amorphous state in the record tracks, and an area between the record tracks is rendered to be in the crystalline state. The record track may also be rendered to be in the crystalline state. In this case, the reflectivity of the crystalline state area is preferably substantially equal to a reflectivity of an erased area. The area between the record tracks is rendered to be completely in the crystalline state so that the area is prevented from gradually nonuniformly crystallized by diffusion of heat to the area between the tracks when the information is rewritten resulting in mixture of pre-recorded information with a reproduced signal of new information (a kind of residual signal), or the increase of noise is prevented. The optical disk medium is rotated and a laser beam (continuous light) of a reproduce power level 101 is irradiated with a single light beam spot along the track to perform auto-focusing and tracking. When the beam spot reaches a rewriting position (A), the power level is raised to a crystallization level (erase level) 102. When the beam spot reaches a new record position (B), the power level is pulsively raised to an amorphous power level (record level) 103. Then, the laser power is lowered to the crystallization level 102. When the cooling rate is reduced by residual heat, the laser power is lowered to a level below the crystallization level (shown by a broken line between C and D) from the amorphous level and then the laser power is raised to the crystallization level. Thereafter, the recorded information is erased. In this case, an average laser power between C and D is preferably between 0 level and a power level immediately below the crystallization level 102, and more preferably between ¼ and ¾ of the crystallization power level. By repeating the above laser power cycle, the information is overwritten. For example, when the rotation speed of the disk was 2400 rpm and a carrier of 1.8 MHz was recorded, a carrier-to-noise (C/N) ratio measured at a band width of 30 KHz was approximately 50 dB. The same position was rewritten with a carrier of 0.9 MHz and a signal of 0.9 MHz was reproduced. A C/N ratio was again approximately 50 dB. The amorphous level (103) laser power was approximately 15 mW, the crystallization level (102) laser power was approximately 7 mW, and the reproduce level (101) laser power was approximately 1 mW. In the above laser power cycle, the information may be recorded by returning the power level from the amorphizing level (103) to the crystallizing level (102), but when the cooling rate is lowered by the residual heat, the C/N ratio or S/N ratio of the reproduced signal may be degraded. By applying a peak power shown by a broken line immediately after the laser power has been raised from the crystallization level 102 to the amorphous level 103, the amorphizing process of the recording film may be accelerated. The magnitude of the peak power may be higher than the amorphizing level 103 by up to a difference between the amorphizing level 103 and the crystallization level 102, and preferably between ¼ to ¾ of the level difference.

In order to prevent information from not being erased, the light beam spot is defocused in the erase mode. This is done by using a focusing lens having a color astigmatism to utilize the fact that the wavelength varies with a change of laser oscillation mode due to a change of laser power. If the beam spot is focused in the record mode, it is defocused when the laser power is at the erase level lower than the record level.

Figure 3:
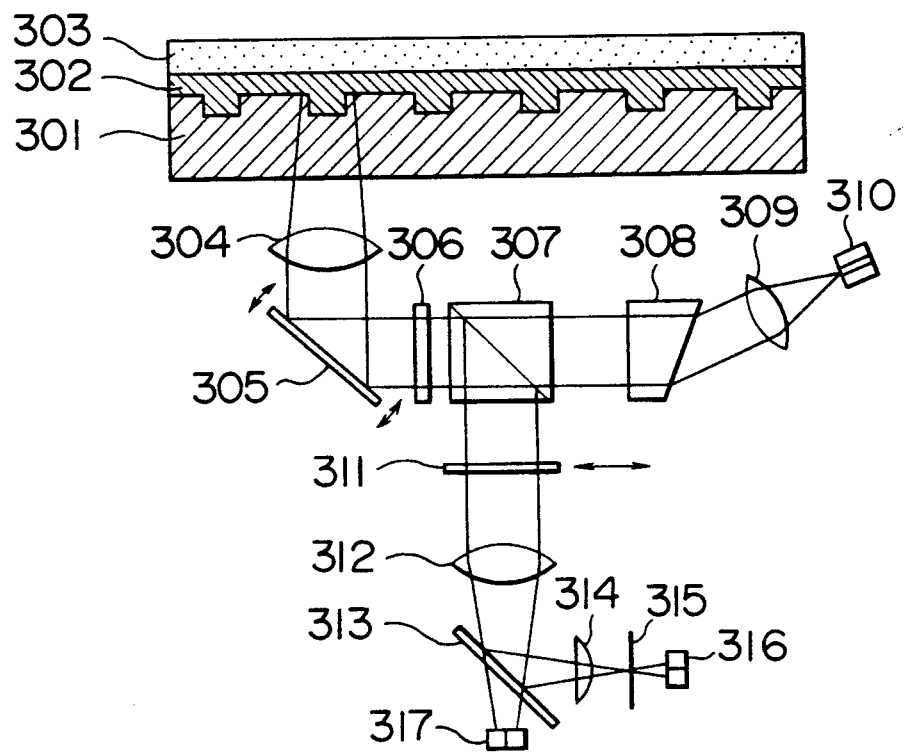
FIG. 3 shows an optical record/reproduce/erase apparatus used in the embodiments of the present invention.

FIG. 3 shows a construction of an optical record/reproduce/erase apparatus used in the embodiment of the present invention. The optical system is essentially identical to an optical system for a commercially available write-once optical disk. Numeral 301 denotes an optical disk substrate, numeral 302 denotes a recording film, numeral 303 denotes a protective film, numeral 304 denotes a focusing lens, numeral 305 denotes a galvanomirror, numeral 306 denotes a quarter wavelength plate, numeral 307 denotes a polarization prism, numeral 308 denotes a prism, numeral 309 denotes a coupling lens, numeral 310 denotes a semiconductor laser, numeral 311 denotes a filter, numeral 312 denotes a convex lens, numeral 313 denotes a half-mirror, numeral 314 denotes a cylindrical lens and numeral 315 denotes a knife edge. Since a reflected light from the recording film 302 increases in the record or erase mode to cause malfunction of the servo system, the reflected light passes through the filter 311 during this mode before the reflected light is directed to an auto-focusing detector 316 and a tracking and signal reproducing detector 317 so that an incident light intensity is reduced. Instead of inserting the filter, the output voltage of the detector may be attenuated during these modes.

Figure 4:
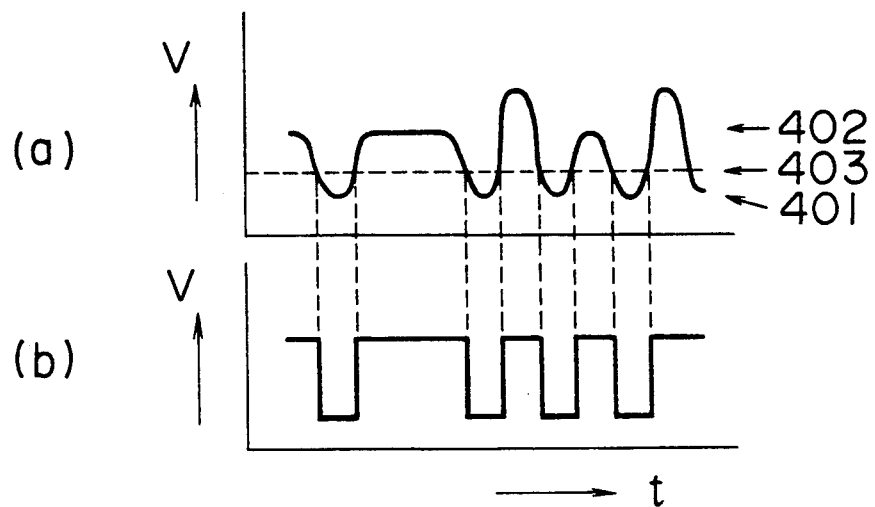
FIG. 4 shows a reproduced signal waveform in the first embodiment and a method for shaping the waveform.

As described above, when the rotating speed of the disk is high, the irradiation time at a point on the disk is too short to completely crystallize the film. When the light of the crystallization level is again irradiated in the rewriting mode, the crystallization is proceeded. As a result, the reflectivity of the crystallized area is not uniform and the reproduced output voltage V varies from point to point as shown in FIG. 4(a). Accordingly, a comparator level 403 is set between a reproduced output voltage 401 of the amorphous area and a reproduced output voltage 402 of a least crystallized area to clip the waveform to produce a waveform shown in FIG. 4(b). When the comparator level is set at an intermediate level of the voltage 401 and 402 or closer to the amorphous area output voltage, the detection is assured. If it is set closer to the crystallized area output voltage, the reproduced waveform is more exact to the original waveform.

Figure 5:
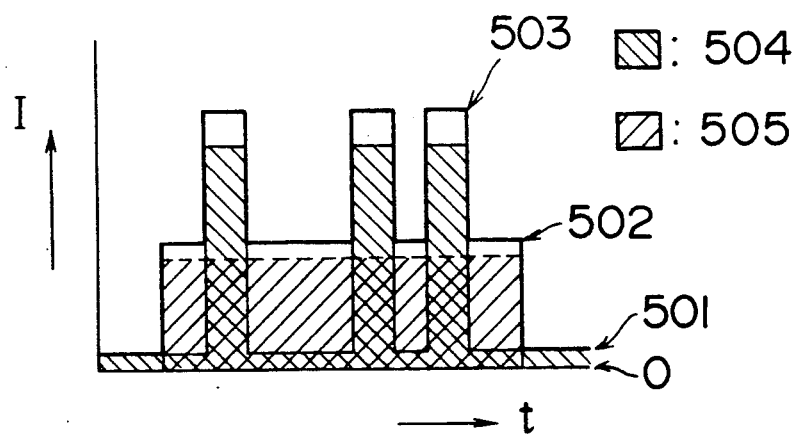
FIG. 5 shows a method for combining rewriting waveforms in the first embodiment.

Either one of the crystallization state and amorphous state may be used for the recorded state or erased state, respectively. However, since the amorphizing laser power is higher, the time at the amorphizing power level should be shorter than the time at the crystallizing power level. In the commercially available optical disk apparatus, the recording pulse emission time is shorter and hence the amorphous state is preferably used for the recording. As shown in FIG. 5, a current (hatched area 505) corresponding to a difference between the reproduce level and the crystallizing level of the rewriting area is superimposed to a laser drive pulse current (hatched area 504) of the commercial write-once optical disk apparatus to produce a current waveform shown by thick solid line. In this manner, a rewritable optical disk may be used. In FIG. 5, the top of the waveform is limited to prevent the amorphous level of the combined waveform from being too high. By lowering the level of the superimposing current 505 or even reducing it to zero, the information of the write-once optical disk can be recorded or reproduced by the rewritable optical disk apparatus.

In the present embodiment, when the amorphous state is changed to the crystalline state or the crystalline state is changed to the amorphous state, the crystalline-crystalline or amorphous-amorphous phase change is attained.

EMBODIMENT 2

Figure 2:
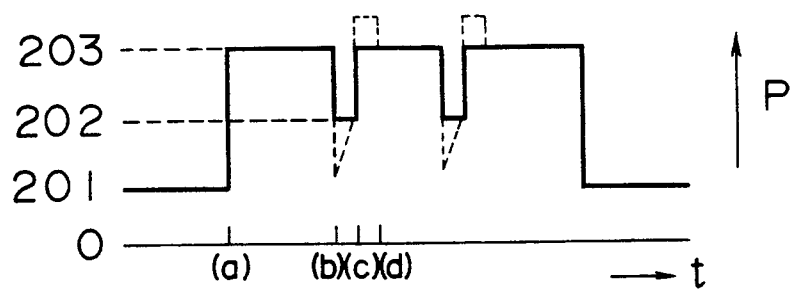
FIG. 2 shows a change of a laser power in a second embodiment of the present invention.

FIG. 2 shows a time transition of a laser power P in another method for recording, reproducing and erasing information in accordance with the present invention. In this embodiment, a record level 202 is lower than an erase level. The recording film, auto-focusing and tracking used in the present embodiment are identical to those of the Embodiment 1. When the beam spot reaches a rewriting place (a), the laser power is abruptly raised to the erase power level 203 and held at that level. During this period, the information is erased. When the beam spot reaches a new recording place (b), the laser power is pulsively lowered to the record power level 202 to record information. The information may be recorded by only lowering the power to the record level 202 as described above, but if the laser power is lowered below the record level 202 as shown by a broken line between (b) and (c) at the beginning of lowering the power and then gradually raised to the record level 202, a time during which the recording area is at a recordable temperature is extended so that the recording is assured. The power level below the record level 202 is preferably just below the record level 202, and more preferably between $\frac{1}{4}$ to $\frac{3}{4}$ of the record level 202. Then, the laser power is raised to the erase level 203. As shown by a broken line between (c) and (d) in FIG. 2, the power is raised above the erase level 203 and then lowered to the erase level 203 so that the erasing is assured. The average power between (c) and (d) may be the erase power level 203 plus a difference between the erase level 203 and the record level 202 and preferably $\frac{1}{4}$ to $\frac{3}{4}$ of such difference. The method for preventing the failure of erasing information is same as that of the Embodiment 1, and the information is recorded, reproduced and erased in the present embodiment by using the optical system of the Embodiment 1 shown in FIG. 1.

Figure 6A:
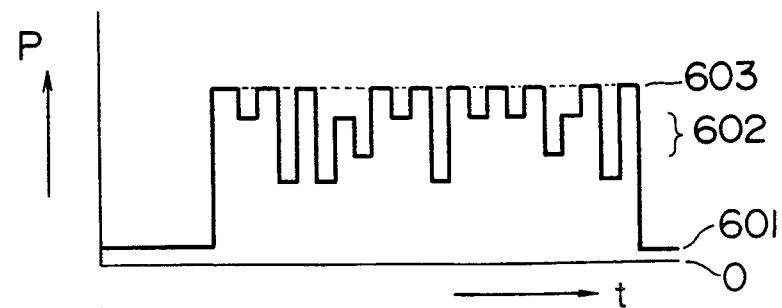
FIGS. 6a and 6b show a principle of multi-value recording in the second embodiment.
Figure 6B:
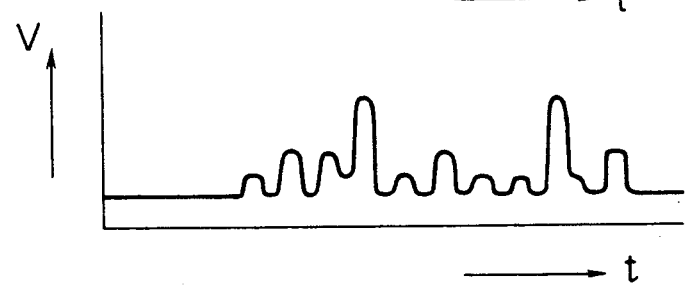

The change of the laser power P when multi-level recording is carried out in the present embodiment is shown in FIG. 6a and a reproduced voltage waveform V is shown in FIG. 6b. Numeral 601 denotes a reproduce level, numeral 602 denotes a record level by crystallization, and numeral 603 denotes an erase level. In FIG. 6, the number of record states is three, but by increasing the number of levels, multi-level recording is attained, and by continuously changing the level, analog recording is attained. Since the change of power level and the change of reproduced voltage are normally not linearly related, at least one of the recording waveform and the reproduced waveform must be converted in order to attain a desired reproduced waveform.

EMBODIMENT 3

The present embodiment relates to a recording medium suitable for the above record/reproduce/erase method.

Figure 7:
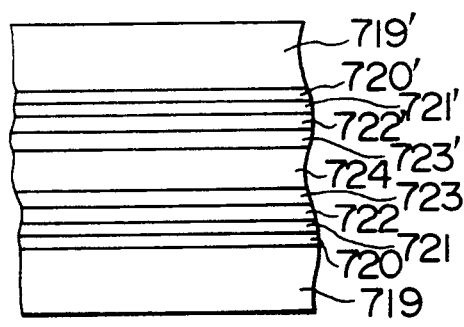
FIG. 7 shows a sectional view of a structure of a recording medium in a third embodiment of the present invention.

A replica of tracking grooves which also functions as a protective layer was formed by ultraviolet ray curing resin on a surface of a disk-shaped chemically reinforced (hardened) glass plate having a diameter of 13 cm and a thickness of 1.2 mm, and a circumference was divided into 32 sectors. At a beginning of each sector, track address and sector address (called header) were inserted in a form of pit at a hill section between the grooves to form a substrate 719 (FIG. 7). An $SiO_2$ layer having a thickness of approximately 300 nm which serves as an anti-reflection layer/protective layer was formed on the substrate 719 by magnetron sputtering.

A recording film 721 having a composition of $Bi_{20}In_{30}Se_{50}$ was formed on the $SiO_2$ layer 720 on the substrate 719 to a thickness of approximately 250 nm by magnetron sputtering. The film thickness was selected such that a reflectivity was almost minimum in a vicinity of a laser beam wavelength used for reading when the lights reflected by the front surface and back surface of the recording film interfere and the recording film was in the amorphous state or low crystalline state. A protective layer 722 having a composition close to $SiO_2$ was then formed to a thickness of approximately 300 nm by magnetron sputtering. Similarly, a protective layer 720' having a composition close to $SiO_2$, a recording film 721' having a composition of $Bi_{20}In_{30}Se_{50}$ and a protective layer 722' having a composition close to SiO were vapor-deposited on another similar substrate 719'. Ultraviolet ray curing resin protective layers 723 and 723' were formed on the vapor-deposited films on the substrates 719 and 719' to a thickness of approximately 50 $\mu$m, and those substrates were bonded together by an organic material bonding layer 724 with the ultraviolet ray curing resin layers 723 and 723' being inside, to prepare a disk.

The disk thus prepared was heated to 150° C. for about one hour. Then, the disk was rotated and Argon ion laser beams (wavelength 488 nm) focused by lenses having a numerical aperture of 0.05 were irradiated onto both surfaces of the disk to fully crystallize the recording films 721 and 721'. Information was recorded in the following manner. The disk was rotated at 1200 rpm and the semiconductor laser beam (wavelength 820 nm) was kept at a non-recording level and focused by a lens in the recording head. The beam was irradiated to one of the recording films through the substrate and a reflected light is detected so that the center of the light spot always aligns to a mid-point between the tracking grooves. In this manner, an influence of noise generated by the grooves is avoided The laser beam was auto-focused so that it was focused onto the recording film while the head was tracked, and the laser power was varied in accordance with the information signal as shown in the Embodiments 1 and 2 to record the information. The head was jumped to another groove as required. As a result of the recording, the reflectivity of the recording film was changed due to the change into the amorphous state. With this recording film, the recorded information may be erased by irradiating a recording light spot having a reduced·power or a laser beam having a larger trackwise length spot and a larger spread toward the adjacent track than the diameter of the recording light spot. When the information is erased by reducing the power of the recording light spot, the waveforms shown in the Embodiments 1 and 2 may be used to rewrite the information in one revolution of the disk. The recording and erasing of the information were possible over more than $3 \times 10_5$ times. When the $SiO_2$ layers on and under the recording film were omitted, noise increased after several times of recording and erasing.

The information was read in the following manner. The disk was rotated at 1200 rpm and a low power semiconductor laser beam which did not cause recording or erasing was irradiated to the disk while the head was tracked and the laser beam was auto-focused, and a reflected light was detected to reproduce the information. In the present embodiment, a signal output of approximately 100 mV was produced The recording film of the present embodiment has a high resistance to oxidization. When the recording film having no $SiO_2$ protective film formed thereon was left in an environment of 60° C. and relative humidity 95%, no significant oxidization was observed.

In the Bi-In-Se system recording film, Co was added with the relative composition of other elements being kept constant. A laser beam power necessary for recording and a crystallization temperature changed with respect to the Co content (X %) as shown below.

|  | Recording laser power | Crystallization temperature |
| --- | --- | --- |
| X = 0 | 12 mW | 220° C. |
| X = 1 | 8 mW | 250° C. |
| X = 2 | 8 mW | 280° C. |
| X = 10 | 8 mW | 350° C. |

The reproduced signal amplitude changed as shown below.

|  | Reproduced signal amplitude |
| --- | --- |
| X = 15 | 80 mV |
| X = 20 | 60 mV |
| X = 30 | 20 mV |

When the content of In was changed with the relative composition of other elements being kept constant, the crystallization temperature for linear heating changed as shown below.

|  | Crystallization temperature | Noise level (relative ratio) |
| --- | --- | --- |
| Z = 0 | 80° C. | 0 dB |
| Z = 15 | 120° C. | 0 dB |
| Z = 20 | 200° C. | 0 dB |
| Z = 45 | 250° C. | +1 dB |
| Z = 55 | 200° C. | +30 dB |
| Z = 70 | 120° C. | +40 dB |
| Z = 80 | Crystallized from the time of film formation | +40 dB |

When the content of Se was changed with the relative composition of other elements being kept constant, the crystallization temperature for linear heating changed as shown below.

|  | Crystallization temperature |
| --- | --- |
| α = 20 | Crystallized from the time of film formation |
| α = 30 | 120° C. |
| α = 35 | 200° C. |
| α = 70 | 200° C. |
| α = 80 | 120° C. |

When a portion or all of Se is replaced by S, it is difficult to form a low noise film, the crystallization temperature slightly lowers but poison decreases.

When the content of Bi was changed with the relative composition of other elements of the Bi-In-Se system recording film being kept constant, the crystallization temperature and the irradiation time necessary for erasure changed as shown below.

|  | Irradiation time for erasure |
| --- | --- |
| Y = 0 | 1.0 μs |
| Y = 2 | 0.8 μs |
| Y = 5 | 0.5 μs |
| Y = 10 | 0.4 μs |
| Y = 15 | 0.3 μs |
| Y = 40 | 0.3 μs |
| Y = 50 | 0.3 μs |

|  | Crystallization temperature |
| --- | --- |
| Y = 0 | 250° C. |
| Y = 15 | 230° C. |
| Y = 35 | 200° C. |
| Y = 40 | 120° C. |
| Y = 70 | Crystallized immediately after vapor-deposition |

When other element represent by A is added, the sensitivity is slightly improved. When Tl or I is added, the irradiation time necessary for erasure is shortened. It is preferable that a high melting point metal element such as Co, and Tl or I coexist.

When the thickness of the recording film is between 80 nm and 150 nm and between 180 nm and 350 nm, the change of reflectivity by the record is enhanced by the interference of the lights. Information can be recorded and erased when the thickness of the recording film is between 15 nm and 450 nm.

When a portion or all of In is replaced by at least one element of Zn, Cd, Sn and Ga, a similar characteristic is attained although a resistance to oxidization is slightly lower. Sn is a most preferable element. Ga is next preferable.

Then a portion or all of In is replaced by at least one element of As, Sb, Si and Ge, if $20 \leq Y \leq 38$, a high melting point metal element such as Co is contained between 1% and 15% and $18 \leq Z \leq 44$, the irradiation time necessary for erasure is less than 0.4 μs and the crystallization temperature is higher than 200° C. (Other element represented by A may be added so long as a total content of the elements A does not exceed 30%).

In the composition $Co_5Bi_{25}Sb_{35}Se_{35}$, when the content of Y was changed with the relative composition of other elements being kept constant, the characteristic changed as shown below.

|  | Irradiation time for erasure | Cystallization temperature |
| --- | --- | --- |
| Y = 0 | 20 μs | 300° C. |
| Y = 2 | 5 μ | 290° C. |
| Y = 5 | 1 μs | 280° C. |
| Y = 10 | 0.5 μs | 250° C. |
| Y = 20 | 0.4 μs | 240° C. |
| Y = 25 | 0.3 μs | 230° .C |
| Y = 38 | 0.3 μs | 200° C. |
| Y = 43 | 0.3 μs | 180° C. |

-continued

|  | Irradiation time for erasure | Cystallization temperature |
|---|---|---|
| Y = 50 | 0.3 μs | 150° C. |

When the content of Z was changed with the relative composition of other elements being kept constant, the characteristic changed as shown below.

|  | Crystallization temperature |
|---|---|
| Z = 0 | 100° C. |
| Z = 15 | 120° C. |
| Z = 18 | 200° C. |
| Z = 20 | 250° C. |
| Z = 44 | 200° C. |
| Z = 50 | 180° C. |
| Z = 70 | 120° C. |

When X or α was changed, the crystallization temperature changed in the same manner as that for the In-Bi-Se system. It is preferable to add Tl and/or I by between 1% and 15%.

From the standpoint of the recording sensitivity and the erasing rate, most preferable range of the In/Se ratio is 1/0.6-½, most preferable range of Sn/Se ratio is 1/1.2-1/2.5, and most preferable range of Ga/Se ratio is 1/0.8-1/1.4.

A most preferable range of Sb/Se ratio is 10.4-1/2.0, and most preferable range of Ge/Se ratio is 1/0.8-1/2.5.

When a portion or all of Bi is replaced by at least one element of Pb, Zn, Cd and Al, a similar characteristic is attained. Pb is most preferable and Zn or Cd is next preferable from the standpoint of erasing rate.

Instead of the SiO protective layer, SiO, $Y_2O_3$ or nitride such as TaN or AlN, sulfide such as $Sb_2S_3$, fluoride such as CeF or composition close to amorphous Si, TiB, B C, B or C may be used as the protective film.

EMBODIMENT 4

The present embodiment also relates to a recording medium like the Embodiment 3.

Figure 8:
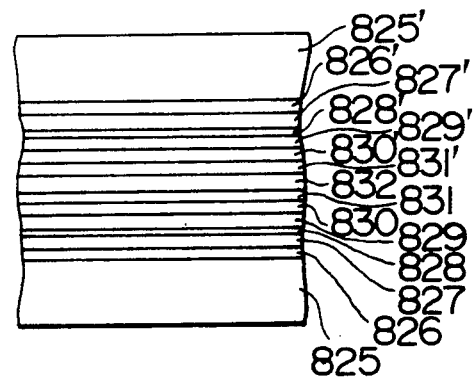
FIG. 8 shows a sectional view of a structure of a recording medium in a fourth embodiment of the present invention.

As shown in FIG. 8, tracking grooves were formed on the surface of a polycarbonate plate by an injection molding method to form a substrate 825, and a protective layer 826 having a thickness of 40 nm and a composition close to $SiO_2$ was formed thereon by sputtering. A recording film 827 having a composition of $Bi_{20}In_{40}Se_{40}$ and a thickness of 30 nm was formed thereon. Then, an intermediate layer 828 having a composition close to $SiO_2$ and a thickness of 20 nm was formed, and a reflection layer 829 having a composition of $Bi_7Sb_3$ and a thickness of 60 nm, and a protective layer 830 having a composition close to $SiO_2$ and a thickness of 40 nm were formed. Similarly, another substrate was formed in the same manner and polyimide layers 831 and 831' were sputtered on the top $SiO_2$ layers 830 and 830' of the substrates to a thickness of approximately 0.5 μm. The substrates were then bonded together by hot-melt bonding material 832 having black pigment added thereto with the polyimide layers being inside, to form a disk. By forming a polyimide layer on the surface of the polycarbonate plate by sputtering, a more stable disk is provided.

The methods of crystallization, recording, erasing and reading are essentially same as those in the Embodiment 3.

Instead of the $SiO_2$ intermediate layer, other inorganic transparent material such as $GeO_2$, $Al_2O_3$, $CeO_2$, $Y_2O_3$, SiO, AlN or TaN described as usable as the protective layer in the Embodiment 3 may be used as the intermediate layer, or an organic material layer may be used. When the thickness of the intermediate layer is 3 nm-40 nm, the mutual diffusion between the recording film and the reflection film in the rewrite mode is prevented and it is optically equivalent to non-presence. Accordingly, the change of reflectivity to the wavelength by the interference of lights is close to that for the two-layer structure of the recording film and the reflection layer.

When the atom arrangement of the reflection layer is changed in the record mode, the reproduced signal is slightly enhanced.

A portion or all of each of the elements B, C and D contained in the recording film may be replaced by at least one of other elements in the same group, when at least one of the elements Co and Tl in the group A is added by between several and 30 atomic %, the erasing rate and the recording sensitivity are improved. The content is preferably between 1% and 15% from the standpoint of S/N ratio.

When the thickness of the recording film is between 15 nm and 50 nm, the reflectivity of the recording film in the amorphous state is lowered by the interference and a large signal is reproduced. The thickness of the reflection layer is between 5 nm and 300 nm, and preferably between 40 nm and 200 nm. By the provision of the reflection layer, a large signal is reproduced with a thinner recording film than a single layer recording film than a single layer recording film. Accordingly, a good characteristic is attained even if the absorption coefficient of the recording film is larger than that of the single layer film.

When the thicknesses of the recording film and intermediate film are changed, a wavelength at which the reflectivity of the readout light is minimized by the interference changes. Since a minimum reflectivity necessary for auto-focusing and tracking is 10-15%, it is necessary that the minimum value of the reflectivity is on the side longer or shorter than the readout light above range. If the minimum value is set to be on the shorter wavelength side, the thickness of the recording film may be thin and loss of energy by heat conduction can be prevented. When the minimum value is on the longer wavelength side, the thickness of the recording film is thick, which is preferable from the standpoint of durability of the recording film and the noise reduction in the rewrite mode.

Instead of the Bi-Sb reflection layer, semiconductor such as Bi, $Bi_2Te_3$, Te, Sn, Sb, Al, Au or Pb, semi-metal, metal or mixture or compound thereof may be used as the reflection layer.

The recording film of the present embodiment also has a high resistance to oxidization as is the recording film of the Embodiment 3. Even if the protective layer has a pinhole, a periphery thereof is not oxidized.

EMBODIMENT 5

The present embodiment relates to a method effective to prevent reduction of a C/N ratio due to repetitive recording, reproducing and erasing of information.

Figure 9A:
FIGS. 9a-9e show a change of a laser power in a fifth embodiment of the present invention.
Figure 9B:
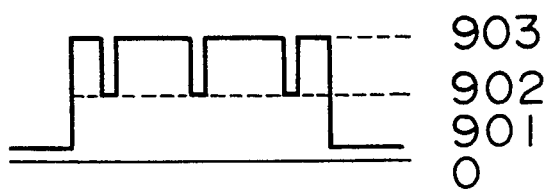
Figure 9C:
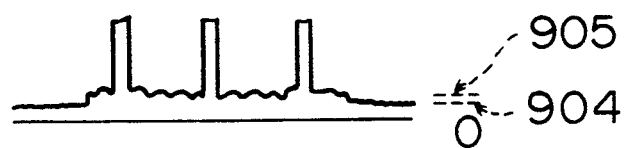

FIG. 9a shows a reproduced output waveform of pre-rewrite information, FIG. 9b shows a time transition of a laser power when recorded information is rewritten, and FIG. 9c shows a change of reflectivity of the recording film (change of reproduced output voltage). Before recording, the recording film may either in the amorphous state or in the crystalline state. As shown in FIG. 9b, the laser power is raised from a low reproduce level 901 to a high amorphizing level 903 and held thereat. If information is present during this period, it is erased. When the laser beam reaches a new information recording point, the laser power is pulsively lowered to an intermediate crystallization level 902. After recording, the laser power is again raised to the high amorphous level 903 and the preexisting information is erased. By repeating the above process, information is recorded. At a point where the medium level laser power was irradiated, the recording film is in the near-amorphous state, and at a point where the middle level laser power was irradiated, the recording film is in the crystalline state. After the power has been raised from the low level to the middle level, the power may be changed between the middle level and the high level. Either one of the crystalline state and the amorphous state may be selected as the record state or erase state, information "1" or "0", or high level or low level. The middle laser power level is preferably between 55% and 90% of the high level, and more preferably between 65% and 85%. If the middle level power is too high or too low, sufficient phase change is not attained during the irradiation. In the preferable range, the S/N ratio was 3 dB lower than that in the more preferable range, and the S/N ratio was more than 6 dB lower in other range. This trend is essentially same for other recording film.

Figure 9D:
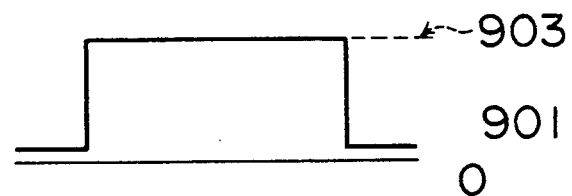
Figure 9E:
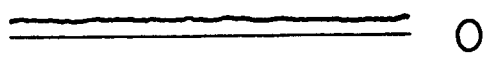

When a recording period is short, complete crystallization may not be attained. If such record/ erase process is repeated many times, the number of times of irradiation by the laser beam and the power level of the laser beam vary from place to place. As a result, the reflectivity may be nonuniform as shown in FIG. 9c depending on the degree of crystallization, type of crystal structure and degree of deformation. Thus, the C/N ratio may be lowered. The reflectivity may also vary during reading of information or when the recording film is placed in a high temperature atmosphere. Numeral 904 denotes a normal level of reflectivity. Such a change of reflectivity is monitored by a low level laser power during the rewrite mode, and if the reflectivity changes beyond a preset level 905, the information for that area is read and recorded at another area on the same disk, or written into another recording medium such as a memory IC. Then, a continuous light of a level to melt the recording film (amorphous level 903) as shown in FIG. 9d is irradiated to render the recording film completely amorphous. By such continuous light irradiation, the reflection level of the initial amorphous state is restored as shown in FIG. 9e. Then, the previously recorded information is overwritten. When the change of reflectivity is detected in the rewrite mode, the information is not refuged to the other recording medium and the new information is recorded after the continuous light irradiation. By repeating the above process once or more each time the reflectivity change is detected, the recorded information can be stably maintained for an extended time period. It is preferable to always monitor the reflectivity change. The above process may be automatically carried out at every predetermined number of times of rewriting, reading or reserving. Instead of continuous light irradiation at the amorphous power level, continuous light irradiation at the crystallization power level may be used.

When the crystallization rate of the recording film is very high, the cooling rate of only the falling portion of the recording pulse light is fast enough to amorphize. In such a case, a continuous light irradiation causes crystallization of the entire recording film (In this case, a portion in which continuous light irradiation finished is not crystallized).

The change by the crystallization may appear not on the track but between tracks. In such a case, the change is covered by the read light spot and a noise is detected. In this case, a target position of tracking may be intentionally shifted or a continuous light may be irradiated by another light beam to the area between tracks (which may be on the tracking groove or between grooves) to unify the change.

We claim:

1. A method for recording, reproducing and erasing information by using an information recording film having a state which changes upon irradiation by a single energy beam from a single energy source and forming a single energy spot, comprising the steps of:

setting first, second and third levels of power of the energy beam to be irradiated onto said information recording film; and allocating said first, second and third levels of power to reproducing, erasing and recording, respectively;

the first level for the reproducing being a low power level at which no recording or erasing is affected even when the energy beam is continuously irradiated on a travelling recording film with the first level;

the second level for the erasing being a higher power level than the first level; and the third level for the recording apparatus alternating with the second level in accordance with an information signal, the third level being applied to the second level so as to be one of added thereto and subtracted therefrom, the third level varying timewise in accordance with the information signal;

wherein at least said second and third power levels include a record power level higher than a reproduce power level and an erase power level lower than the recording power level and higher than the reproduce power level; and in order to rewrite the information power of a laser providing the energy beam is pulsively varied from the reproduce power level to the erase power level, from the erase power level to the record power level, and from the record power level to the erase power level and, among the power level variations, the last two power level variations including from the eras power level to the record power level, and from the record power level to the erase power level are repeated; and wherein when the power level is raised from the erase power level to the record power level, the power level is at least one of raised beyond the record power level within a difference between the record power level and the erase power level and then lowered to the record power level, and lowered from the record power level to the erase power level, lowered beyond the erase power level and then returned to the erase power level.

2. A method for recording, reproducing and erasing information by using an information recording film having a state which changes upon irradiation by a single energy beam from a single energy source and forming a single energy spot, comprising the steps of:

setting first, second and third levels of power of the energy beam to be irradiated onto said information recording film; and allocating said first, second and third levels of power to reproducing, erasing and recording, respectively;

the first level for the reproducing being a low power level at which no recording or erasing is effected even when the energy beam is continuously irradiated on a travelling recording film with the first level;

the second level for the erasing being a higher power level than the first level; and the third level for the recording apparatus alternately with the second level in accordance with an information signal, the third level being applied to the second level so as to be one of added thereto and subtracted therefrom, the third level varying timewise in accordance with the information signal;

wherein said power levels include a record power level higher than a reproduce power level and an erase power level at least one of higher and lower than the record power level, and laser power of a laser providing the energy beam is pulsively varied from the reproduce power level to the erase power level, from the erase power level to the record power level, and from the record power level to the erase power level in order to rewrite the information, and among the power level variations, two power level variations including from the erase power level to the record power level, and from the record power level to the erase power level are repeated; and wherein when the power level is at least one of lowered from the erase power level to the record power level, lowered beyond the record power level and then returned to the record power level, and raised from the record power level to the erase power level, raised beyond the erase power level within a difference between the erase power level and the record power level and then returned to the erase power level.

3. A method for recording, reproducing and erasing information by using an information recording film having a state which changes upon irradiation by a single energy beam from a single energy source and forming a single energy spot, comprising the steps of:

setting first, second and third levels of power of the energy beam to be irradiated onto said information recording film; and allocating said first, second and third levels of power to reproducing, erasing and recording, respectively;

the first level for the reproducing being a low power level at which no recording or erasing is effected even when the energy beam is continuously irradiated on a travelling recording film with the first level;

the second level for the erasing being a higher power level than the first level; and the third level for the recording apparatus alternately with the second level in accordance with an information signal, the third level being applied to the second level so as to be one of added thereto and subtracted therefrom, the third level varying timewise in accordance with the information signal;

wherein a comparator level is set between two levels in the reproduced signal corresponding to two power levels to shape a waveform; and wherein the comparator level is set close to a reproduce voltage of the less crystallized state of two reproduce voltages.

4. A method for recording, reproducing and erasing information by using an information recording film having a state which changes upon irradiation by a single energy beam from a single energy source and forming a single energy spot, comprising the steps of:

setting first, second and third levels of power of the energy beam to be irradiated onto said information recording film; and alternating said first, second and third levels of power to reproducing, erasing and recording, respectively;

the first level for the reproducing being a low power level at which no recording or erasing is effected even when the energy beam is continuously irradiated on a travelling recording film with the first level;

the second level for the erasing being a higher power level than the first level; and the third level for the recording apparatus alternately with the second level in accordance with an information signal, the third level being applied to the second level so as to be one of added thereto and subtracted therefrom, the third level varying timewise in accordance with the information signal;

wherein at least the second and third power levels include at least three or more power levels, and the at least three power levels are used to effect multilevel recording.

5. A method for recording, reproducing and erasing information according to claim 4, wherein the lowest one of the at least three power levels is set as an erase level, and the power level is raised to the erase level at the beginning of a record area.

6. A method for recording, reproducing and erasing information by using an information recording film having a state which changes upon irradiation by a single energy beam from a single energy source and forming a single energy spot, comprising the steps of:

setting first, second and third levels of power of the energy beam to be irradiated onto said information recording film; and allocating said first, second and third levels of power to reproducing, erasing and recording, respectively;

the first level for the reproducing being a low power level at which no recording or erasing is effected even when the energy beam is continuously irradiated on a travelling recording film with the first level;

the second level for the erasing being a higher power level than the first level; and the third level for the recording apparatus alternately with the second level in accordance with an information signal, the third level being applied to the second level so as to be one of added thereto and subtracted therefrom, the third level varying timewise in accordance with the information signal;

wherein an irradiation time period of the energy beam of the second level is longer than an irradiation time period of the energy beam of the third level when the third level is higher than the second level.

7. A method for recording, reproducing and erasing information by varying power level between three power levels of a low, an intermediate and a high level of a single energy beam from a single energy source and forming a single energy spot which is irradiated on a recording medium; and auto-focusing and tracking are carried out at least at the low power level and rewriting of the information is carried out while said single energy spot of said energy beam once passes across the recording medium, comprising the steps of:

raising at least the intermediate power level among the three power levels when the recording medium is a rewritable recording medium; and lowering at least the intermediate power level among the three power levels when the recording medium is a write-once recording medium which allows recording only once;

thereby enabling use of one apparatus to update recording by overwriting on the rewritable recording medium and to reproduce, and to record and reproduce on and from the write-once recording medium.

8. A method for recording, reproducing and erasing information according to claim 7, wherein an irradiation time period with the high power level is shorter than an irradiation time period with the intermediate power level.

9. A method for recording, reproducing and erasing information by varying power levels between three power levels of a low, an intermediate, and a high level of a single energy beam from a single energy source and forming a single energy spot which is irradiated on a recording medium, and auto focusing and tracking are carried out at least at the low power level and rewriting of the information is carried out while said single energy spot of said energy beam once passes across the recording medium, comprising the step of:

driving a source of said energy beam by superimposing a current corresponding to a difference between a read power level of the low power level and the intermediate power level to a current which varies power of said energy beam in accordance with an information signal between the read power level of the low power level and a power level higher than the read power level.

10. A method for recording, reproducing and erasing information according to claim 9, wherein the level of the current which is added for superimposing is one of lowered and reduced to zero, thereby enabling use of one apparatus to record, reproduce, and erase the information on and from a rewritable recording medium and a write-once recording medium.

11. A method for recording, reproducing and erasing information, by varying power levels between three power levels of a low, an intermediate, and a high level of a single energy beam from a single energy source and forming a signal energy spot which is irradiated on a recording medium, and autofocusing and tracking are carried out at least at the low power level and rewriting of the information is carried out while said single energy spot of said energy beam once passes across the recording medium, said method comprising the steps of:

setting a record power level including the intermediate and high levels which are higher than a reproduce power level, setting an erase power level lower than the record level and higher than the reproduce level, varying the laser power pulsively from the reproduce power level to the erase power level, from the erase power level to the record power level, and from the record power level to the erase power level, and further repeating the last two of the power level variations, including from the erase power level to the record power level, and from the record power level to the erase power level thereby to rewrite the information.

12. A method for recording, reproducing and erasing information according to claim 11, wherein the intermediate power level of the plurality of power levels renders the recording medium to a relatively highly crystallized state.

13. A method for recording, reproducing and erasing information according to claim 11, wherein the high power level of the plurality of power levels renders the recording medium to a relatively lowly crystallized state.

14. A method for recording, reproducing and erasing information according to claim 11, wherein a record track on the information recording medium on which record points are formed is least crystallized in at on average less a central portion thereof than that in a periphery thereof.

15. An apparatus for recording, reproducing and erasing information by varying power levels between three power levels of a low, an intermediate and a high level of a single energy beam from a single energy source and forming a single energy spot which is irradiated on a recording medium, and autofocusing and tracking are carried out at least at the low power level and rewriting of the information is carried out while said single energy spot of said energy beam once passes across the recording medium, said apparatus comprising;

means for raising at least the intermediate power level among the three power levels when the recording medium is a rewritable recording medium, and means for lowering at least the intermediate power level among the three power levels when the recording medium is a write-once recording medium which allows recording only once;

thereby enabling use of one apparatus to update recording by overwriting on the rewritable recording medium and to reproduce, and to record and reproduce on and from the write-once recording medium.

16. An apparatus for recording, reproducing and erasing information according to claim 15, wherein an irradiation time period with said high power level is shorter than an irradiation time period with said intermediate power level.

17. An apparatus for recording, reproducing and erasing information by varying power levels between three power levels of a low, an intermediate, and a high level of a single energy beam from a single energy source and forming a single energy spot which is irradiated on a recording medium, and autofocusing and tracking are carried out at least at the low power level and rewriting of the information is carried out while said single energy spot of said energy beam once passes across the recording medium, said apparatus comprising:

means for driving said single energy source by superimposing a current corresponding to a difference between a read power level of the low power level and the intermediate power level to a current which varies power of the energy beam in accordance with an information signal between the read power level of the low power level and a power level higher than the read power level.

18. An apparatus for recording, reproducing and erasing information according to claim 17, wherein the level of the current which is added for superimposing is one of lowered and reduced to zero thereby enabling use of one apparatus to record, reproduce, and erase the information on and from a rewritable recording medium and a write-once recording medium.

19. An apparatus for recording, reproducing and erasing information according to claim 17, wherein an irradiation time period with said high power level is shorter than an irradiation time period with said intermediate power level.

* * * * *

UNITED STATES PATENT AND TRADEMARK OFFICE
CERTIFICATE OF CORRECTION

PATENT NO.     : 5,123,007
DATED          : June 16, 1992
INVENTOR(S)    : Miyauchi et al.

It is certified that error appears in the above-identified patent and that said Letters Patent is hereby corrected as shown below:

Column 18,
Line 17, please amend claims 1-4 and 6 as follows:
1. A method for recording, reproducing and erasing information by using an information recording film having a state which changes upon irradiation by a single energy beam from a single energy source and forming a single energy spot, comprising the steps of:
   setting first, second and third levels of power of the energy beam to be irradiated onto said information recording film; and
   allocating said first, second and third levels of power to reproducing, erasing and recording, respectively;
   the first level for the reproducing being a low power level at which no recording or erasing is affected even when the energy beam is. continuously irradiated on a travelling recording film with the first level;
   the second level for the erasing being a higher power level than the first level; and
   the third level for the recording appearing alternately with the second level in accordance with an information signal, the third level being applied to the second level so as to be one of added thereto and substracted therefrom, the third level varying time-wise in accordance with the information signal;
   wherein at least said second and third power levels include a record power level higher than a reproduce power level and an erase power level lower than the recording power level and higher than the reproduce power level; and in order to rewrite the information power of a laser providing the energy beam is pulsively varied from the reproduce power level to the erase power level, from the erase power level to the record power level, and from the record power level to the erase power level and, among the power level variations, the last two power level variations including from the eras power level to the record power level, and from the record power level to the erase power level are repeated; and
   wherein when the power level is raised from the erase power level to the record power level, the power level is at least one of raised beyond the record power level within a difference between the record power level and the erase power level and then lowered to the record power level, and lowered from the record power level to the erase. Power level, lowered beyond the erase power level and then returned to the erase power level.

UNITED STATES PATENT AND TRADEMARK OFFICE
CERTIFICATE OF CORRECTION

| | |
|---|---|
| PATENT NO. | : 5,123,007 |
| DATED | : June 16, 1992 |
| INVENTOR(S) | : Miyauchi et al. |

It is certified that error appears in the above-identified patent and that said Letters Patent is hereby corrected as shown below:

Column 18 (cont'd),
2.     A method for recording, reproducing and erasing infromation
by using an information recording film having a state w fihich changes upon
irradiation by a single energy beam from a single energy source and
forming a single energy spot, comprising the steps of:
    setting first, second and third levels of power of the energy beam to
be irradiated onto said information recording film; and
allocating said first, second and third levels of power to
reproducing, erasing and recording, respectively;
    the first level for the reproducing being a low power level at which
no recording or erasing is effected even when the energy beam is
continuously irradiated on a travelling recording film with the first level;
    the second level for the erasing being a higher power level than the
first level; and
    the third level for the recording appearing alternately with  the
second level in accordance with an information signal, the third level
being applied to the second level so as to be one of added thereto and
substracted therefrom, the third level varying time-wise in accordance with
the information signal;
    wherein said power levels include a record power level higher than
a reproduce power level and an erase power level at least one of higher
and lower than the record power level, and laser power of a. laser
providing the energy beam is pulsively varied from the reproduce power
level to the erase power level, from the erase power level to the record
power level, and from the record power level to the erase power level in order
to rewrite the information, and among the power level variations, two
power level variations including from the erase power level to the record
power level, and from the record power level to the erase power level are
repeated; and
    wherein when the power level is at least one of lowered from the
erase power level to the record power level, lowered beyond the record
power level and then returned to the record power level, and raised from
the record power level to the erase power level, raised beyond the erase
power level within a difference between the erase power level and the
record power level and then returned to the erase power level.

UNITED STATES PATENT AND TRADEMARK OFFICE
CERTIFICATE OF CORRECTION

PATENT NO.   : 5,123,007
DATED        : June 16, 1992
INVENTOR(S)  : Miyauchi et al.

It is certified that error appears in the above-identified patent and that said Letters Patent is hereby corrected as shown below:

Column 18 (cont'd),
3.      A method for recording, reproducing and erasing information by using an information recording film having a state which changes upon irradiation by a single energy beam from a single energy source and forming a single energy spot, comprising the steps of:
    setting first, second and third levels of power of the energy beam to be irradiated onto said information recording film; and
    allocating said first, second and third levels of power to reproducing, erasing and recording, respectively;
    the first level for the reproducing being a low power level at which no recording or erasing, is effected even when the energy beam is continuously irradiated on a travelling recording film with the first level;
    the second level for the erasing being a higher power level than the first level; and
    the third level for the recording appearing alternately with the second level in accordance with an information signal, the third level being applied to the. second level so as to be one of added thereto and substracted therefrom, the third level varying time-wise in accordance with the information signal;
    wherein a comparator level is set between two levels in the reproduced signal corresponding to two power levels to shape a waveform; and
    wherein the comparator level is set close to a reproduce voltage of the less crystallized state of two reproduce voltages.

4.      A method for recording, reproducing and erasing information by using an information recording film having a state which changes upon irradiation by a single energy beam from a single energy source and forming a single energy spot, comprising the steps of:
    Setting first, second and third levels of power of the energy beam be irradiated onto said information recording film; and
    alternating said first, second and third levels of power to reproducing, erasing and recording, repectively;
    the first level for the reproducing being a low power level, at which no recording or erasing is effected even when the energy beam is continuously irradiated on a travelling recording film with the first level;
    the second level for the erasing being a higher power level than the first level; and

UNITED STATES PATENT AND TRADEMARK OFFICE
CERTIFICATE OF CORRECTION

PATENT NO.    : 5,123,007
DATED         : June 16, 1992
INVENTOR(S)   : Miyauchi et al.

It is certified that error appears in the above-identified patent and that said Letters Patent is hereby corrected as shown below:

Column 18 (cont'd),
    the third level for the recording appearing alternately with the second level in accordance with an information signal, the third level being applied to the second level so to be one of added thereto and subtracted therefrom, the third level varying time-wise in accordance with the information signal;
    wherein at least the second and third power levels include at least three or more power levels, and the at least three power levels are used to effect multilevel recording.

Line 40, 6.    A method for recording, reproducing and erasing information by using an information recording film having a state which changes upon irradiation by a single energy beam from a single energy source and forming a single energy spot, comprising the steps of:
    setting first, second and third levels of power of the energy beam to be irradiated onto said information recording film; and
    allocating said first, second and third levels of power to reproducing, erasing and recording, respectively;
    the first level for the reproducing being a low power level at which no recording or erasing is effected even when the energy beam is continuously irradiated on a travelling recording film with the first level;
    the second level for the erasing being a higher power level than the first level; and
    the third level for the recording appearing alternately with the second level in accordance with an information signal, the the third level being applied to the second level so as to be one of added thereto and substracted therefrom, the third level varying time-wise in accordance with the information signal;

UNITED STATES PATENT AND TRADEMARK OFFICE
CERTIFICATE OF CORRECTION

PATENT NO. : 5,123,007
DATED : June 16, 1992
INVENTOR(S) : Miyauchi et al.

It is certified that error appears in the above-identified patent and that said Letters Patent is hereby corrected as shown below:

Column 18 (cont'd),
    wherein an irradiation time period of the energy beam of the second level is longer than an irradiation time period of the energy beam of third level when the third level is higher than the second level.

Signed and Sealed this

Thirty-first Day of May, 2005

JON W. DUDAS
*Director of the United States Patent and Trademark Office*